United States Patent
Fu et al.

(10) Patent No.: US 7,215,614 B2
(45) Date of Patent: May 8, 2007

(54) CONTROL METHOD OF RECORDING SPEED IN OPTICAL DISC DRIVES

(75) Inventors: Ren Chien Fu, Taipei (TW); Chien Chun Ma, Taipei (TW)

(73) Assignee: Lite-On It Corporation, Taipei (TW)

(*) Notice: Subject to any disclaimer, the term of this patent is extended or adjusted under 35 U.S.C. 154(b) by 518 days.

(21) Appl. No.: 10/885,019

(22) Filed: Jul. 7, 2004

(65) Prior Publication Data
US 2005/0018569 A1 Jan. 27, 2005

(30) Foreign Application Priority Data
Jul. 24, 2003 (TW) .............................. 92120171 A

(51) Int. Cl.
*G11B 5/09* (2006.01)
(52) U.S. Cl. ................ 369/47.33; 369/47.34; 369/47.32; 369/47.36; 369/59.14
(58) Field of Classification Search .............. None
See application file for complete search history.

(56) References Cited

U.S. PATENT DOCUMENTS

| 5,986,980 | A | * | 11/1999 | Takeshita et al. ........ 369/30.23 |
| 6,795,382 | B2 | * | 9/2004 | Kitamura et al. ........ 369/47.11 |
| 2006/0114779 | A1 | * | 6/2006 | Wada et al. ............... 369/47.3 |

* cited by examiner

*Primary Examiner*—Muhammad Edun
(74) *Attorney, Agent, or Firm*—Bacon & Thomas, PLLC

(57) ABSTRACT

The present invention discloses a control method of recording speed in an optical disc drive. Firstly it is determined whether the recording speed is higher than a data transfer rate from the host to the data buffer in the optical disc drive. If so, the recording speed is set to the data transfer rate and disc writing is continued with a constant linear velocity (CLV) mode.

13 Claims, 4 Drawing Sheets

CONTROL METHOD OF RECORDING SPEED IN OPTICAL DISC DRIVES

This application claims the benefit of Taiwan application Serial No. 092120171, filed on Jul. 24, 2004, the subject matter of which is incorporated herein by reference.

BACKGROUND OF THE INVENTION

1. Field of the Invention

The invention relates in general to a control method of recording speed in optical disc drives, and more particularly to a control method capable of effectively increasing average recording speed in optical disc drives.

2. Description of the Related Art

It is well known that modes of writing data to a CD-R or CD-RW by a recordable optical drive is generally classified into four categories, all of which are described separately as follow:

(I) Constant Linear Velocity Mode (Referred to Hereinafter as CLV Mode)

CLV mode indicates that the track length of a disc passing through a laser pickup head per time unit is constant, which means the disc is rotated in such a manner that a relative linear velocity between the disc and the laser pickup head is maintained at a constant value. Therefore, when the laser pickup head records inner parts of the disc, the rotational speed of the disc is higher than the rotational speed of the disc when the laser pickup head records outer parts of the disc. In other words, the rotational speed of the disc is determined by the locations of the laser pickup head under CLV mode, and the rotational speed of the disc is decreasing when the laser pickup head moves from the inner part to the outer part of the disc. Conventionally, an optic disc drive with 1× recording speed has a definition that the relative speed between the laser pickup head and the disc is about 1.2 m/s to 1.4 m/s, and the data transfer rate is 4.3218 MB/s. Moreover, the definition of each other optical disc drives with higher recording speeds has direct proportion with above mentioned values separately, such as 2×, 4×, 8×, 16×, 20×, and so on.

(II) Constant Angular Velocity Mode (Referred to hereinafter as CAV Mode).

CAV mode indicates that the disc is rotated in such a manner that a rotation speed of the disc is maintained at a constant value, which means difference of recording speed is between the inner part and the outer part of the disc when the rotational speed of the disc is constant. In other words, the recording speed is lower when the laser pickup head records data to the inner part of the disc than the recording speed when the laser pickup head records data to the outer part of the disc.

(III) Zoned Constant Linear Velocity Mode (Referred to hereinafter as ZCLV Mode).

ZCLV mode indicates that the recording surface of a disc is divided into several zones from its inner part to its outer part, and each zone of the recording surface is recorded at a controlled speed with CLV mode. Referring to FIG. 1, the recording speed in zone 1 is 16×, the recording speed in zone 2 where starts from the time point of T1 on the disc is 20×, and the recording speed in zone 3 where starts from the time point of T2 on the disc is 24×, the highest recording speed of the drive disc. It should be noticed here that ZCLV mode applies a super-link technology in order to connect the time point T1 and the time point T2 on the disc. The super-link technology establishes connection between time points on the disc which respectively correspond to stopping of disc writing so that the recording process can be stop temporally and continue writing. As a result, zone1 is linked to zone2, and zone2 is linked to zone3.

(IV) Partial Constant Angular Velocity Mode (Referred to hereinafter as PCAV Mode).

PCAV mode indicates that the recording speed is increasing as the movement of the laser pickup head from inner part to outer part of the disc until the recording speed reaches the highest recording speed that the disc allowed or the highest recording speed that the optical disc drive provides, and the recording speed will be maintained at a constant value that equals to the highest speed. Referring to FIG. 2, it is a schematic diagram showing the time on the disc when data is recorded with PCAV mode vs. the data transfer rate. The recording surface of the disc is divided into a CAV zone and a CLV zone by the time point of T4 on the disc. The disc is rotated at a constant velocity value by a motor before the time point of T4 on the disc so that the recording speed is increasing from inner part to outer part of the disc at the recording speed 4× to 10× until the time point of T4 on the disc. Then, the recording speed is maintained as 10× with CLV mode after the time point of T4 on the disc.

Referring to FIG. 3, it is a schematic diagram showing where data travels when data is recorded in a conventional optical disc drive. Conventionally, a host 1 sends data into a data buffer 3 in the optical disc drive when the optical disc drive starts to write data, and the current recording speed is called data transfer rate. Then, a servo system 5 catches data from the data buffer 3 according to the predetermined recording speed in the optical disc drive. Finally, a laser pickup head 7 is controlled by the servo system 5 to record data.

The state of the data buffer 3 is monitored during the recording process in the optical disc drive. However, buffer underrun easily happens when the recording speed is higher than the data transfer rate so that the recording process is failed. In order to reduce the probability of buffer underrun happening, the servo system 5 usually sends a command of decreasing the recording speed to the laser pickup head 7, so that the recording speed will slow down and the probability of buffer underrun happening will be reduced.

Referring to FIG. 4, it is a schematic diagram showing the time on the disc vs. the recording speed when writing speeds are lowered down. Take PCAV mode as an example. Firstly, the optical disc drive sets its recording speed of constant linear velocity zone to the highest recording speed that the disc allowed, such as 40×. But the servo system 5 will slow down the recording speed if the data transfer rate is low and buffer underrun happens, as shown in FIG. 4. At beginning, the recording speed of constant linear velocity zone is 40×, and then the recording speed is decreased to 32× according the command sent from the servo system 5 if the host 1 cannot attain 40× data transfer rate. Further, the recording speed is decreased to 24× if the data transfer rate is still low. However, the algorithm of decreasing recording speed damages the efficiency of data recording seriously. Although decreasing recording speed can ensure the data recorded and prevent buffer underrun happening, the recording speed of the optical disc drive is greatly affected because the host 1 cannot maintain same data transfer rate that equals to the highest recording speed that the disc allows. Analogously, during the decreasing process of the recording speed, link will exist between 40× and 32×, and between 32× and 24× so as to raise difficulty of reading data for the optical disc drive. Therefore, it is necessary to provide a method capable of effectively controlling the recording speed in the optical disc drive and keeping the recording quality of data.

SUMMARY OF THE INVENTION

It is therefore an object of the invention to provide a control method of recording speed in optical disc drives so that the low average recording speed problem in optical disc drives when buffer underrun happens can be resolved.

The invention achieves the above-identified object by providing a control method of recording speed in an optical disc drive. Firstly it is determined whether the recording speed is higher than the data transfer rate(from the host to the data buffer in the optical disc drive). If yes, set the recording speed to the data transfer rate and continue writing with CLV mode.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
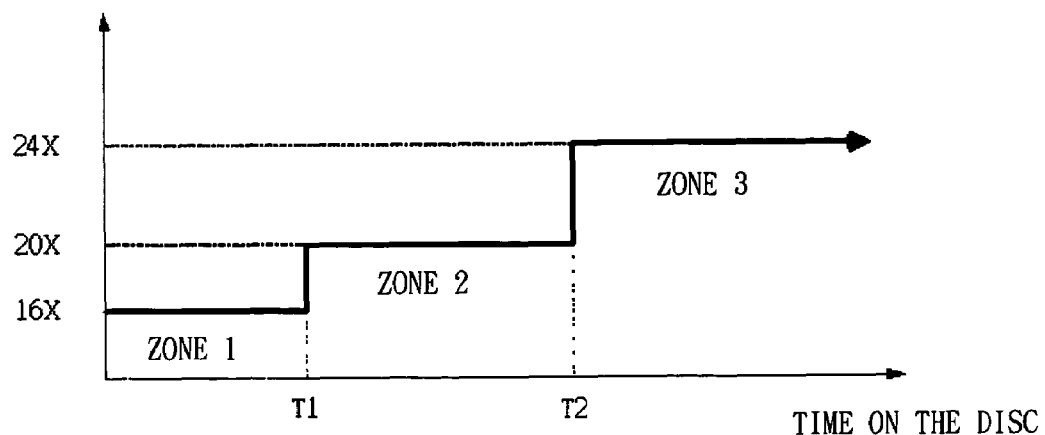
FIG. 1 is a schematic diagram showing the time on the disc when data is recorded with ZCLV mode vs. the data transfer rate.
Figure 2:
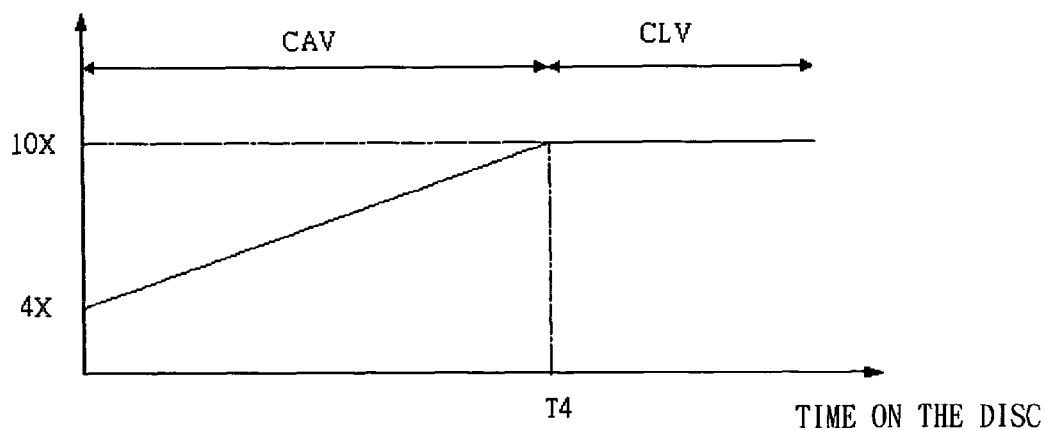
FIG. 2 is a schematic diagram showing the time on the disc when data is recorded with PCAV mode vs. the data transfer rate.
Figure 3:
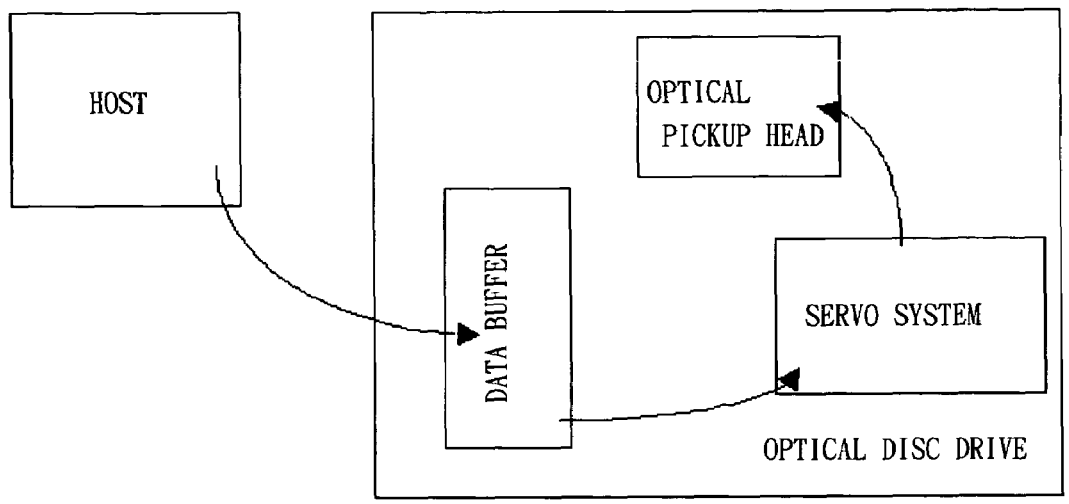
FIG. 3 (Prior Art) is a schematic diagram showing where data travels when data is recorded in a conventional optical disc drive.
Figure 4:
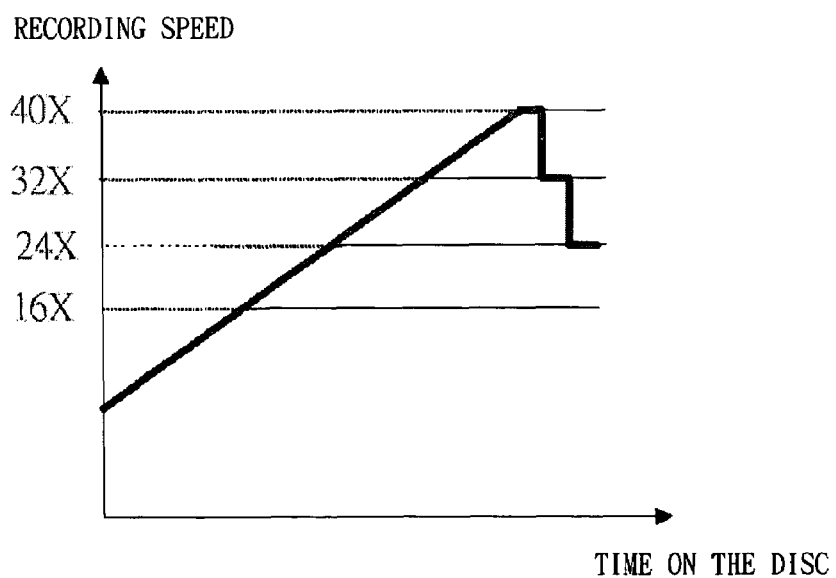
FIG. 4 (Prior Art) is a schematic diagram showing the time on the disc when writing speeds are lowered down vs. the recording speed.
Figure 5:
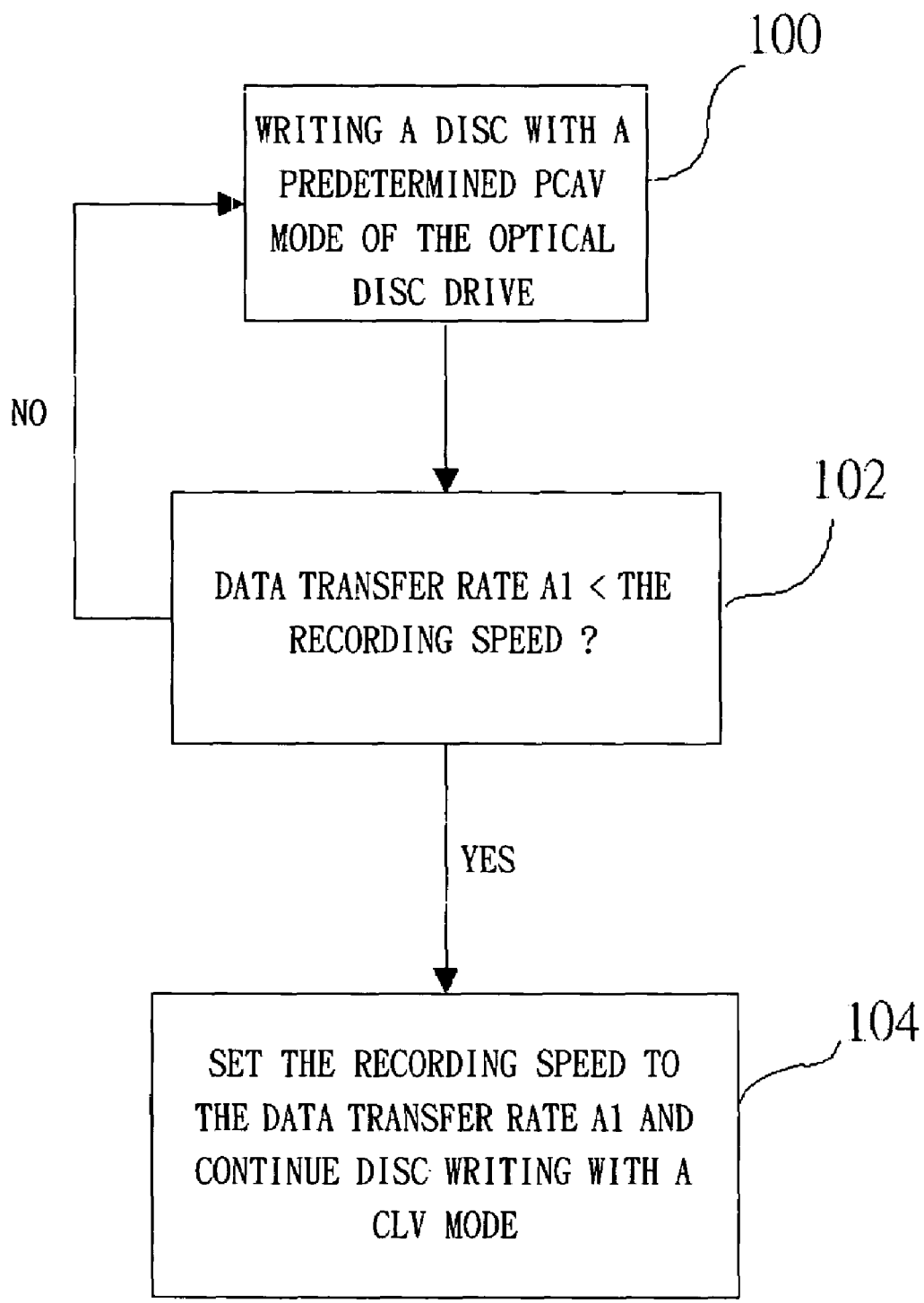
FIG. 5 is a flow chart showing a control method of recording speed in an optical disc drive according to the preferred embodiment of the invention.

Referring to FIG. 5, a flow chart showing a control method of recording speed in an optical disc drive according to the preferred embodiment of the invention is shown in flow chart form, wherein the process begins at step 100. At step 100, data is recorded with a predetermined PCAV mode of the optical disc drive. The recording speed will be determined by a servo system according to the disc that is recorded at the beginning of the recording process. Then, as described at step 102, it is determined whether the recording speed is higher than the data transfer rate A1 from the host to the data buffer in the optical disc drive. If so, the method proceeds to step 104; otherwise, the method repeats from step 100. At step 104, the recording speed is set to the data transfer rate A1 and disc writing is continued with a CLV mode.

Figure 6:
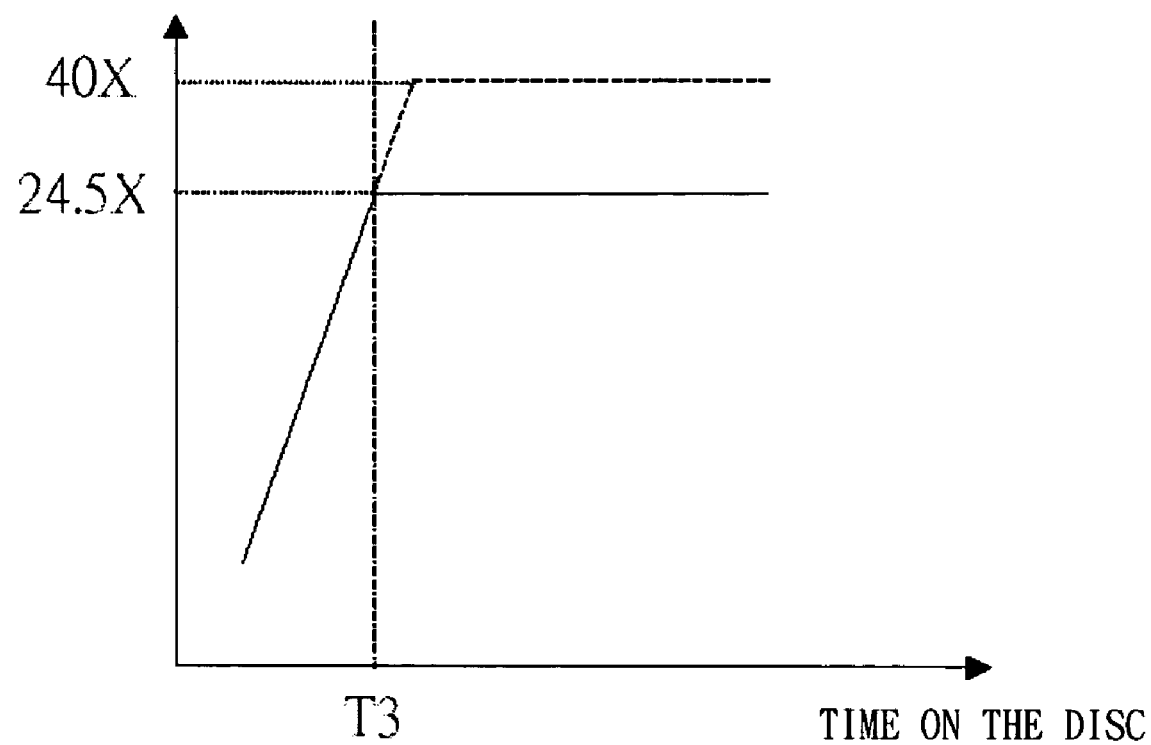
FIG. 6 is a schematic diagram showing the time on the disc vs. the recording speed according to the preferred embodiment of the invention.

FIG. 6 is a schematic diagram showing the time on the disc vs. the recording speed according to the preferred embodiment of the invention. Data is recorded to a disc whose highest allowable recording speed is 40× by an optical disc drive with a PCAV mode. When the recording process is under real-time monitoring, the recording surface of the disc is divided into a CAV zone and a CLV zone by the time point of T3 on the disc where buffer underrun might occur because the data transfer rate form the host to the data buffer is low. The disc is rotated at a constant velocity value by a motor before the time point of T3 on the disc so that the recording speed is increasing from inner part to outer part of the disc until the time point of T3 on the disc. The data transfer rate at the time point of T3 on the disc is 24.5×. Then, the recording speed is set to the data transfer rate, 24.5×, with CLV mode after the time point of T3 on the disc so as to prevent buffer underrun.

The present invention is applicable to situations other than those with the PCAV mode. The low average recording speed problem in optical disc drives, as the recording speeds decreases, can be resolved by using CAV mode according to the invention. Once the data transfer rate from the host to the data buffer is lower than the predetermined recording speed of the optical disc drive, the recording speed can be set to the data transfer rate and disc writing continues with a CLV mode.

As a result, the advantage of the present invention is flexibility in modulating the recording speed of the optical disc drive, enabling the recording speed switching to CLV mode from any high recording speed with CAV mode. The recording speed is determined by how fast the host transfers data to the data buffer, so that the average recording speed is improved.

Also, the occurrence of link can be prevented in the control method of recording speed in an optical disc drive of the present invention by switching CAV mode to CLV mode directly instead of changing the recording speed of different zones with ZCLV mode so as to prevent the absence of data in the recorded disk.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method of recording speed in an optical disc drive, comprising the steps of:
   when writing a disc with a specific mode, stopping the specific mode if, at a time point, a predetermined recording speed of the specific mode for writing the disc in the optical disc drive is higher than a data transfer rate from a host to a data buffer in the optical disc drive; and
   writing a disc area which is after the time point on the disc at the data transfer rate when the specific mode is stopped.

2. The control method according to claim 1, wherein the specific mode is a constant angular velocity (CAV) mode.

3. The control method according to claim 1, wherein the specific mode is a partial constant angular velocity (PCAV) mode.

4. The control method according to claim 3, wherein the recording speed is a recording speed of constant linear velocity zone of the PCAV mode and is a highest recording speed that the disc allows.

5. The control method according to claim 3, wherein the recording speed is a recording speed of constant linear velocity zone of the PCAV mode and is a highest recording speed supported by the optical disc drive.

6. The control method according to claim 1, wherein the disc is a recordable disc.

7. A control method of recording speed in an optical disc drive, comprising the steps of:
determining, when writing a disc, whether a predetermined recording speed of the optical disc drive is higher than a data transfer rate from a host to a data buffer in the optical disc drive; and
If so, setting the recording speed to the data transfer rate and continuing writing the disc with a constant linear velocity mode.

8. The control method according to claim 7, wherein the specific mode is a constant angular velocity (CAV) mode.

9. The control method according to claim 7, wherein the specific mode is a partial constant angular velocity (PCAV) mode.

10. The control method according to claim 9, wherein the recording speed is a recording speed of constant linear velocity zone of the PCAV mode and is a highest recording speed that the disc allows.

11. The control method according to claim 9, wherein the recording speed is a recording speed of constant linear velocity zone of the PCAV mode and is a highest recording speed supported by the optical disc drive.

12. The control method according to claim 7, wherein the disc is a recordable disk.

13. The control method according to claim 7, wherein the disc is acompact disc-rewritable (CD-RW) disc.

* * * * *